US012666215B2

(12) United States Patent
Lee et al.

(10) Patent No.: US 12,666,215 B2
(45) Date of Patent: Jun. 23, 2026

(54) METHOD OF RENDERING OBJECT-BASED AUDIO AND ELECTRONIC DEVICE PERFORMING THE METHOD

(71) Applicant: Electronics and Telecommunications Research Institute, Daejeon (KR)

(72) Inventors: Yong Ju Lee, Daejeon (KR); Jae-Hyoun Yoo, Daejeon (KR); Dae Young Jang, Daejeon (KR); Soo Young Park, Daejeon (KR); Young Ho Jeong, Daejeon (KR); Kyeongok Kang, Daejeon (KR); Tae Jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 295 days.

(21) Appl. No.: 18/484,117

(22) Filed: Oct. 10, 2023

(65) Prior Publication Data

US 2024/0129682 A1 Apr. 18, 2024

(30) Foreign Application Priority Data

Oct. 11, 2022 (KR) ........................ 10-2022-0129907
Apr. 4, 2023 (KR) ........................ 10-2023-0044165

(51) Int. Cl.
*H04S 7/00* (2006.01)

(52) U.S. Cl.
CPC ............. *H04S 7/30* (2013.01); *H04S 2400/11* (2013.01)

(58) Field of Classification Search
CPC ..... G10L 19/008; G10L 19/167; G10L 19/20; G06F 3/165; H04S 3/008; H04S 7/30; H04S 2400/01; H04S 2400/11; H04S 2400/13; H04S 2400/15; H04S 2420/03
See application file for complete search history.

(56) References Cited

U.S. PATENT DOCUMENTS 8,903,720 B2 12/2014 Lee et al.
2016/0029138 A1* 1/2016 France .................. G10L 19/008 381/23
2019/0385621 A1 12/2019 Lee et al.
2021/0168548 A1 6/2021 Honma et al.
2022/0030373 A1* 1/2022 Mehta ....................... H04S 7/30

FOREIGN PATENT DOCUMENTS

KR 10-2011-0122631 11/2011

OTHER PUBLICATIONS

ISO/IEC JTC1/SC29/WG6/N147, "Second version of Text of MPEG-I Immersive Audio Working Draft of RMO", ISO 23090-4:202#(X), 2022, pp. 1-287.

* cited by examiner

*Primary Examiner* — Paul Kim
(74) *Attorney, Agent, or Firm* — KILE PARK REED & HOUTTEMAN PLLC

(57) ABSTRACT

A method of rendering object-based audio and an electronic device performing the method are provided. The method includes identifying a bitstream, determining a reference distance of an object sound source based on the bitstream, determining a minimum distance for applying distance-dependent attenuation, based on the reference distance, and determining a gain of object-based audio included in the bitstream based on the reference distance and the minimum distance.

8 Claims, 9 Drawing Sheets

100

400

METHOD OF RENDERING OBJECT-BASED AUDIO AND ELECTRONIC DEVICE PERFORMING THE METHOD

CROSS-REFERENCE TO RELATED APPLICATION

This application claims the benefit of Korean Patent Application No. 10-2022-0129907 filed on Oct. 11, 2022 and 10-2023-0044165 filed on Apr. 4, 2023, in the Korean Intellectual Property Office, the entire disclosures of which are incorporated herein by reference for all purposes.

BACKGROUND

1. Field of the Invention

One or more embodiments relate to a method of rendering object-based audio and an electronic device performing the method.

2. Description of the Related Art

Audio services have changed from mono and stereo services to 5.1 and 7.1 channels and to multi-channel services such as 9.1, 11.1, 10.2, 13.1, 15.1, and 22.2 channels including upstream channels.

In addition, object-based audio service technology, which unlike existing channel services regards a sound source as an object and stores/transmits/plays information related to object-based audio such as an object-based audio signal, the position and size of object-based audio, and the like is also being developed.

The above description has been possessed or acquired by the inventor(s) in the course of conceiving the present disclosure and is not necessarily an art publicly known before the present application is filed.

SUMMARY

Embodiments provide a method and electronic device for rendering object-based audio that may calculate an attenuation effect according to a distance in rendering object-based audio for reproducing spatial sound.

Embodiments provide the method and electronic device for rendering object-based audio that may, when a reference distance for determining a gain of object-based audio is less than a minimum distance for determining whether to apply an attenuation effect according to a distance, set the reference distance or the minimum distance, determine the gain of the object-based audio, and render the object-based audio.

According to an aspect, there is provided a method of rendering object-based audio, the method including identifying a bitstream, determining a reference distance of an object sound source based on the bitstream, determining a minimum distance for applying distance-dependent attenuation, based on the reference distance, and determining a gain of object-based audio included in the bitstream based on the reference distance and the minimum distance.

The determining of the minimum distance may include determining, when the reference distance is greater than a set value of the minimum distance, the set value to be the minimum distance.

The determining of the minimum distance may include determining, when the reference distance is equal to or less than a set value of the minimum distance, the reference distance to be the minimum distance.

The determining of the gain of the object-based audio may include determining, when a distance of the object sound source is equal to or less than the minimum distance, the gain of the object-based audio to be a set size.

The determining of the gain of the object-based audio may include determining the gain of the object-based audio based on a ratio of the distance of the object sound source to the reference distance when the distance of the object sound source is greater than the minimum distance.

According to an aspect, there is provided a method of rendering object-based audio, the method including identifying a bitstream, determining a reference distance of an object sound source to be equal to or greater than a minimum distance that is for applying distance-dependent attenuation, based on the bitstream, and determining a gain of object-based audio included in the bitstream based on the minimum distance and the reference distance.

The determining of the reference distance of the object sound source may include determining the reference distance within a range from a value equal to or greater than the minimum distance to a value equal to or less than a set maximum reference distance.

The determining of the gain of the object-based audio may include determining, when a distance of the object sound source is equal to or less than the minimum distance, the gain of the object-based audio to be a set size.

The determining of the gain of the object-based audio may include determining the gain of the object-based audio based on a ratio of the distance of the object sound source to the reference distance when the distance of the object sound source is greater than the minimum distance.

According to an aspect, there is provided an electronic device including a processor, wherein the processor is configured to identify a bitstream, determine a reference distance of an object sound source based on the bitstream, determine a minimum distance for applying distance-dependent attenuation, based on the reference distance, and determine a gain of object-based audio included in the bitstream based on the reference distance and the minimum distance.

The processor may be configured to determine, when the reference distance is greater than a set value of the minimum distance, the set value to be the minimum distance.

The processor may be configured to determine, when the reference distance is equal to or less than a set value of the minimum distance, the reference distance to be the minimum distance.

The processor may be configured to determine, when a distance of the object sound source is equal to or less than the minimum distance, the gain of the object-based audio to be a set size.

The processor may be configured to determine the gain of the object-based audio based on a ratio of the distance of the object sound source to the reference distance when the distance of the object sound source is greater than the minimum distance.

Additional aspects of embodiments will be set forth in part in the description which follows and, in part, will be apparent from the description, or may be learned by practice of the disclosure.

According to various embodiments, when calculating, using a reference distance and a minimum distance, a gain of object-based audio to which attenuation according to a distance of an object sound source is applied, the problem of a result different from a result of a typical application of an attenuation effect according to a distance being obtained may be solved.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
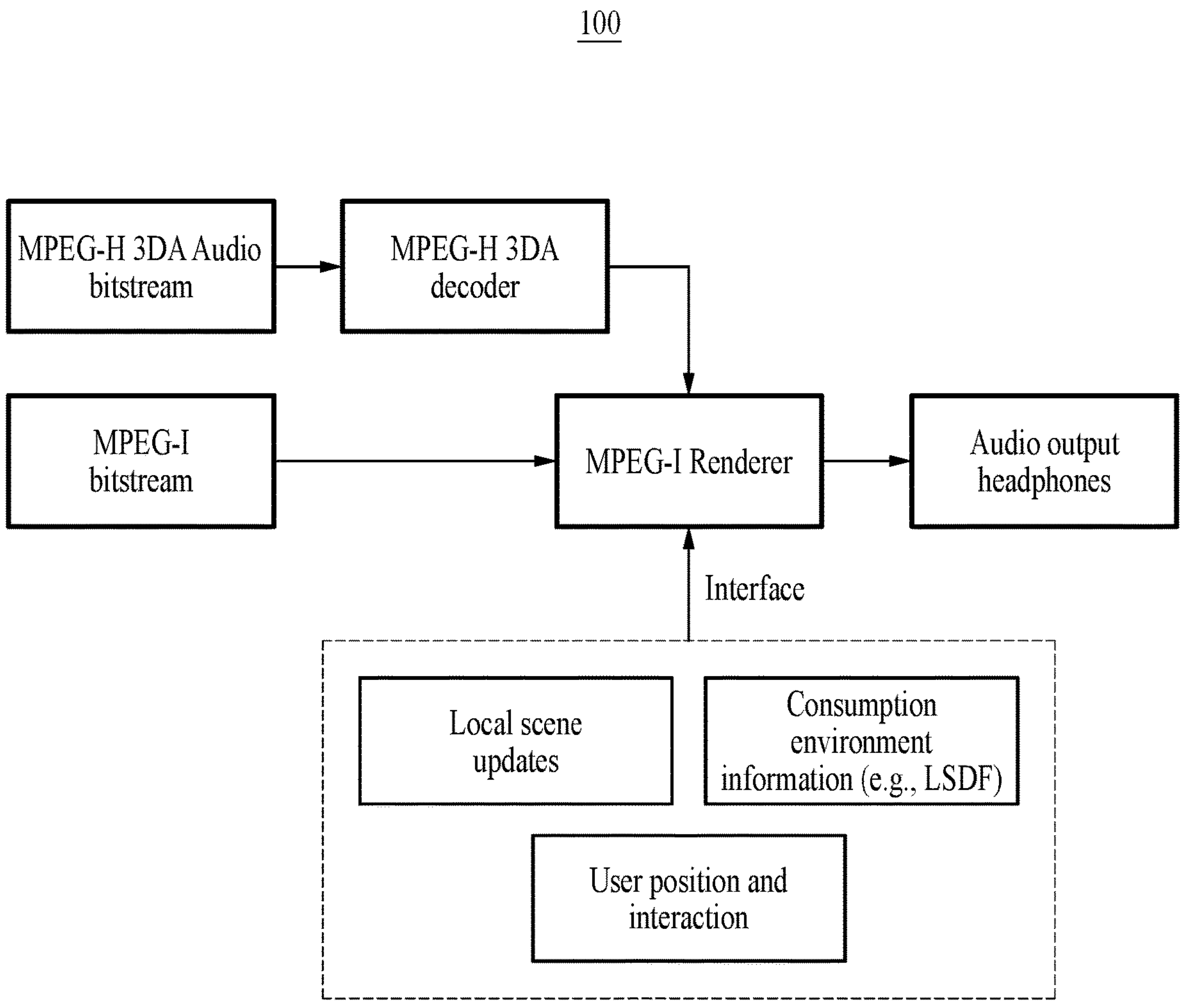
FIG. 1 is a diagram illustrating a rendering architecture according to an embodiment.

Hereinafter, embodiments are described in detail with reference to the accompanying drawings. However, various alterations and modifications may be made to the embodiments. Here, the embodiments are not meant to be limited by the descriptions of the present disclosure. The embodiments should be understood to include all changes, equivalents, and replacements within the idea and the technical scope of the disclosure.

The terminology used herein is for the purpose of describing particular embodiments only and is not intended to be limiting. The singular forms "a," "an," and "the" are intended to include the plural forms as well, unless the context clearly indicates otherwise. It should be further understood that the terms "comprises/comprising" and/or "includes/including," when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical or scientific terms used herein have the same meaning as those commonly understood by one of ordinary skill in the art to which the embodiments belong. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

When describing the embodiments with reference to the accompanying drawings, like reference numerals refer to like components and a repeated description related thereto is omitted.

In the description of embodiments, detailed description of well-known related structures or functions is omitted when it is deemed that such description may cause ambiguous interpretation of the present disclosure.

FIG. 1 is a diagram illustrating a rendering architecture 100 according to an embodiment. For example, a renderer (e.g., MPEG-I renderer of FIG. 1) may operate at a global sampling frequency of 48 kilohertz (kHz). Input pulse-code modulation (PCM) audio data using a different sampling frequency may be resampled to 48 kHz before processing.

FIG. 1 may represent how a renderer connects to external devices such as MPEG-H 3DA coded audio element bitstreams, a metadata MPEG-I bitstream, and other interfaces.

For example, an audio element (e.g., an MPEG-H 3DA audio bitstream) coded in MPEG-H 3DA may be decoded by an MPEG-H 3DA decoder. The decoded audio may be rendered together with an MPEG-I bitstream. An MPEG-I bitstream may transfer an audio scene description and other metadata used by the renderer to the renderer. In addition, an interface that may access consumption environment information, scene updates during playback, user interaction, and user position information may be input to the renderer.

The renderer may provide real-time auralization of a six degrees of freedom (6DoF) audio scene in which a user may directly interact with entities in the scene. For the real-time auralization of the 6DoF audio scene, a multithreaded software architecture may be divided into several workflows and components. A block diagram including a renderer component may be shown in FIG. 2. The renderer may support rendering of virtual reality (VR) and augmented reality (AR) scenes. The renderer may obtain rendering metadata and audio scene information for the VR and AR scenes from the bitstream. For example, in the case of an AR scene, the renderer may obtain listening space information for the AR scene as a listener space description format (LSDF) file during playback.

Figure 2:
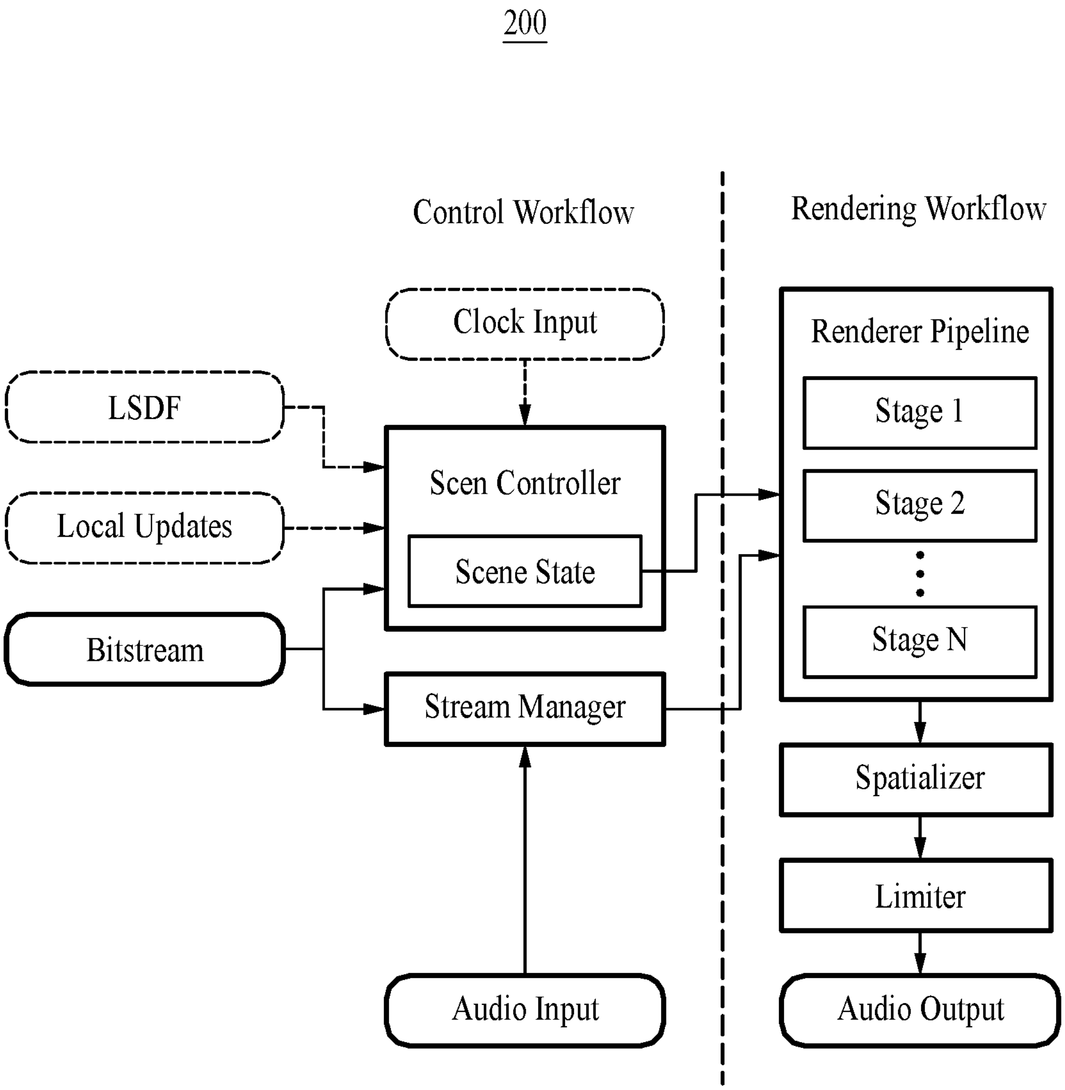
FIG. 2 is a diagram illustrating control and rendering workflows of an audio signal processing apparatus according to various embodiments.

FIG. 2 is a diagram illustrating control and rendering workflows 200 of an audio signal processing apparatus according to various embodiments.

According to an embodiment, an audio signal processing apparatus may render object-based audio using an object-based audio signal and metadata. For example, an audio signal processing apparatus may refer to a renderer.

For example, the audio signal processing apparatus may perform the real-time auralization of a 6DoF audio scene in which the user may directly interact with entities of a sound scene. The audio signal processing apparatus may render a VR or AR scene. In the case of a VR or AR scene, the audio signal processing apparatus may obtain metadata and audio scene information from a bitstream. In the case of an AR scene, the audio signal processing apparatus may obtain listening space information of a listening space in which a user is located from an LSDF file.

As shown in FIG. 1, the audio signal processing apparatus may output audio through the control workflow and the rendering workflow.

The control workflow is an entry point of the renderer, and the audio signal processing apparatus may interface with an external system and component through the control workflow. The audio signal processing apparatus may adjust a state of entities of a 6DoF scene and implement an interactive interface using a scene controller in the control workflow.

The audio signal processing apparatus may control a scene state. The scene state may reflect a current state of all scene objects including an audio element, transformation/anchor, and geometry. The audio signal processing apparatus may generate all scene objects of the entire scene before rendering starts and update metadata of all scene objects to be in a state in which a desired scene configuration is reflected when playback starts.

The audio signal processing apparatus may provide an integrated interface to a renderer component in order to access an audio stream connected to an audio element in the scene state, using a stream manager. The audio stream may be input as a pulse-code modulation (PCM) float sample. A source of the audio stream may be, for example, a decoded MPEG-H audio stream or locally captured audio.

A clock may provide an interface to the renderer component, which may provide a current scene time in seconds. A clock input may be, for example, a synchronization signal of another subsystem or an internal clock of the renderer.

The rendering workflow may generate an audio output signal. The audio output signal may be, for example, a PCM float. The rendering workflow may be separated from the control workflow. The scene state for transferring all of the changes of the 6DoF scene and the stream manager for providing an input audio stream may access the rendering workflow for communication between the two workflows (the control workflow and the rendering workflow).

A renderer pipeline may auralize the input audio stream provided by the stream manager, based on a current scene state. For example, rendering may be performed according to a sequential pipeline, such that an individual renderer stage may implement an independent perceptual effect and use the processing of previous and subsequent stages.

A spatializer may terminate the renderer pipeline and auralize an output of a renderer stage into a single output audio stream suitable for a desired playback method (e.g. binaural or loudspeaker playback).

A limiter may provide a clipping protection function for an auralized output signal.

Figure 3:
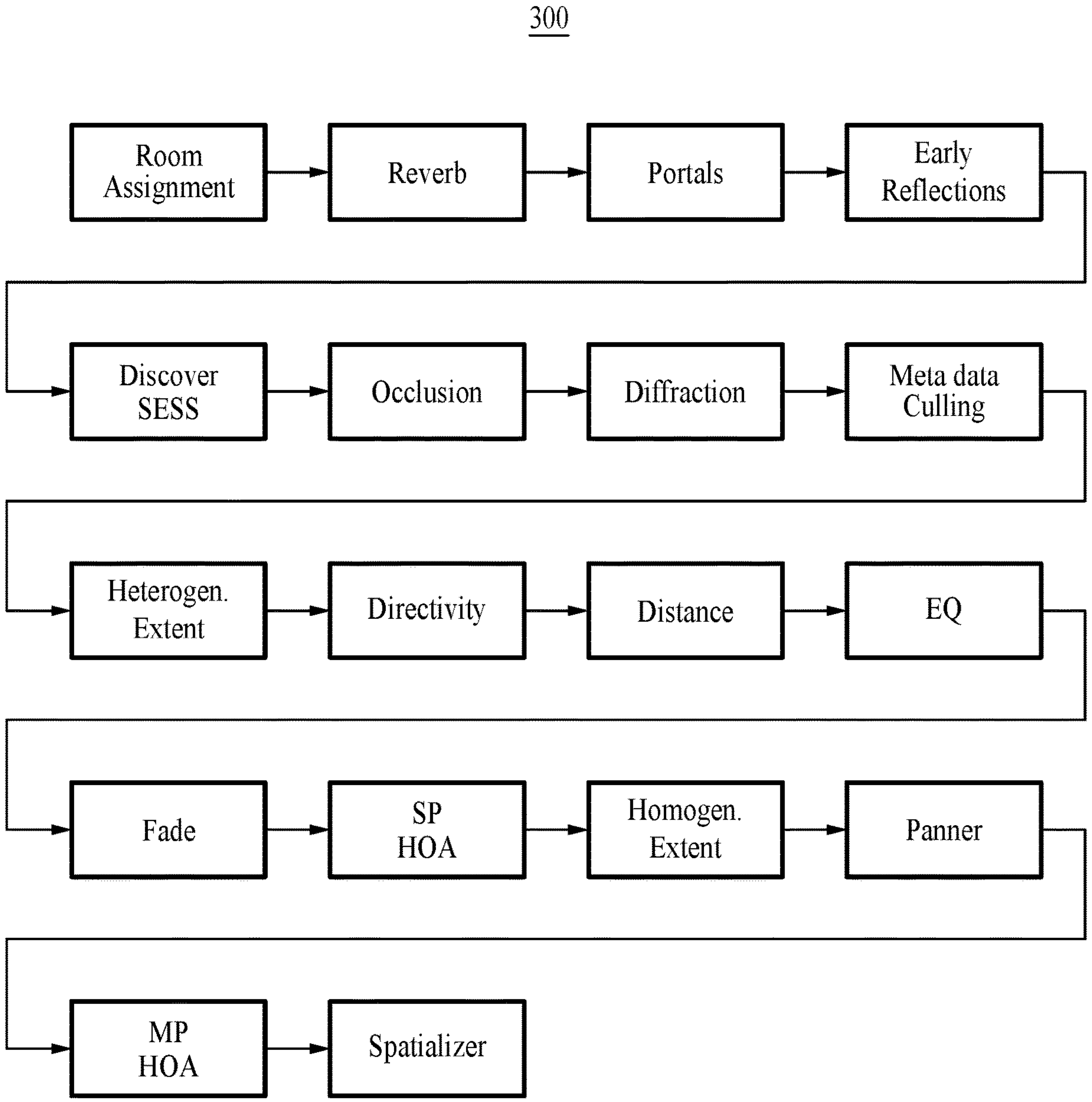
FIG. 3 is a diagram illustrating a renderer pipeline according to various embodiments.

FIG. 3 is a diagram illustrating a renderer pipeline 300 according to various embodiments.

For example, each renderer stage of the renderer pipeline 300 may be performed according to a set order. For example, the renderer pipeline 300 may include room assignment, reverb, portal, early reflection, volume discover SESS, occlusion (or obstruction), diffraction, metadata management (metadata culling), heterogeneous-volume sound source (Heterogeneous extent), directivity, distance, equalizer (EQ), fade, single-point Higher-order Ambisonics (SP HOA), homogeneous-volume sound source (Homogeneous extent), panner, and multi-point HOA (MP HOA) stages.

For example, an audio signal processing apparatus may render a gain, propagation delay, and medium absorption of object-based audio according to a distance between the object-based audio and a listener in a rendering workflow (e.g., the rendering workflow of FIG. 2). For example, the audio signal processing apparatus may determine at least one of the gain, propagation delay, and medium absorption of the object-based audio in a distance stage of a renderer pipeline.

The audio signal processing apparatus may calculate a distance between each render item (RI) and the listener in the distance stage and interpolate a distance between update routine calls of an object-based audio stream based on a constant velocity model. The RI may refer to all audio elements in the renderer pipeline.

The audio signal processing apparatus may apply the propagation delay to a signal related to the RI in order to create a physically accurate delay and Doppler effect.

The audio signal processing apparatus may model frequency-independent attenuation of an audio element due to geometric spreading of source energy by applying distance attenuation. The audio signal processing apparatus may use a model that considers the size of a sound source for distance attenuation of a geometrically extended sound source.

The audio signal processing apparatus may apply medium absorption to the object-based audio by modeling frequency-dependent attenuation of an audio element related to an absorption characteristic of air.

The audio signal processing apparatus may determine a gain of the object-based audio by applying distance attenuation according to a distance between the object-based audio and the listener. The audio signal processing apparatus may apply distance attenuation due to the geometric spreading using a parametric model that considers the size of a sound source.

When audio is played back in a 6DoF environment, a sound level of the object-based audio may vary according to a distance, and the size of the object-based audio may be determined according to the 1/r law in which the size decreases in inverse proportion to the distance. For example, the audio signal processing apparatus may determine the size of the object-based audio according to the 1/r law in a region in which the distance between the object-based audio and the listener is greater than the minimum distance and less than the maximum distance. The minimum distance and the maximum distance may refer to distances set to apply attenuation according to distance, propagation delay, and an air absorption effect.

For example, the audio signal processing apparatus may identify a position of the listener (e.g., 3D spatial information), a position of the object-based audio (e.g., 3D spatial information), and a velocity of the object-based audio using metadata. The audio signal processing apparatus may calculate the distance between the listener and the object-based audio using the position of the listener and the position of the object-based audio.

The size of an audio signal delivered to the listener may vary according to a distance between an audio source (e.g., the position of the object-based audio) and the listener. For example, in general, the size of a sound transferred to a listener located at a distance of 2 m from the audio source is less than the size of a sound transferred to a listener located at a distance of 1 m from the audio source. In a free field environment, the size of a sound may decrease at a rate of 1/r (Here, r is the distance between the object-based audio and the listener). When the distance between the audio source and the listener doubles, the size of a sound (or sound level) heard by the listener may be reduced by about 6 dB.

The law of distance and sound level attenuation may be applied in a 6DoF VR environment. For one object-based audio signal, the audio signal processing apparatus may use a method of reducing the size of the object-based audio signal when a distance is far from the listener and increasing the size of the object-based audio signal when the distance is short from the listener.

For example, if a sound pressure level of the sound heard by the listener is 0 dB when the listener is 1 m away from an audio object, in the case that the listener moves to be 2 m away from the object, when the sound pressure level is changed to −6 dB, it may feel as if the sound pressure naturally decreases.

For example, when the distance between the object-based audio and the listener is greater than the minimum distance and less than the maximum distance, the audio signal processing apparatus may determine the gain of the object-based audio according to Equation 1 below. In Equation 1 below, "reference distance" may indicate a reference distance, and "current_distance" may indicate the distance between the object-based audio and the listener. The reference distance may refer to a distance at which the gain of the object-based audio is 0 dB and may be set differently for each object-based audio. For example, the metadata may include the reference distance of the object-based audio.

$$\text{Gain [dB]} = 20\log(\text{reference\_distance}/\text{current\_distance}) \quad \text{[Equation 1]}$$

For example, an RI may indicate an acoustically activated element in a scene. The RI may be a primary RI, i.e., derived directly from an audio element in the scene or a secondary RI, i.e., derived from another RI (e.g., through reflection or a diffracted path). Properties of the RI may be as the description in Table 1 below.

For example, the RI may include ItemType. When the ItemType is Primary, it may indicate that the RI is directly derived from a scene object. When the ItemType is Reflection, it may indicate that the RI is a secondary RI derived by specular reflection of another RI. When ItemType is Diffraction, it may indicate that the RI is a secondary RI derived through a geometrically diffracted path of another RI.

Figure 4:
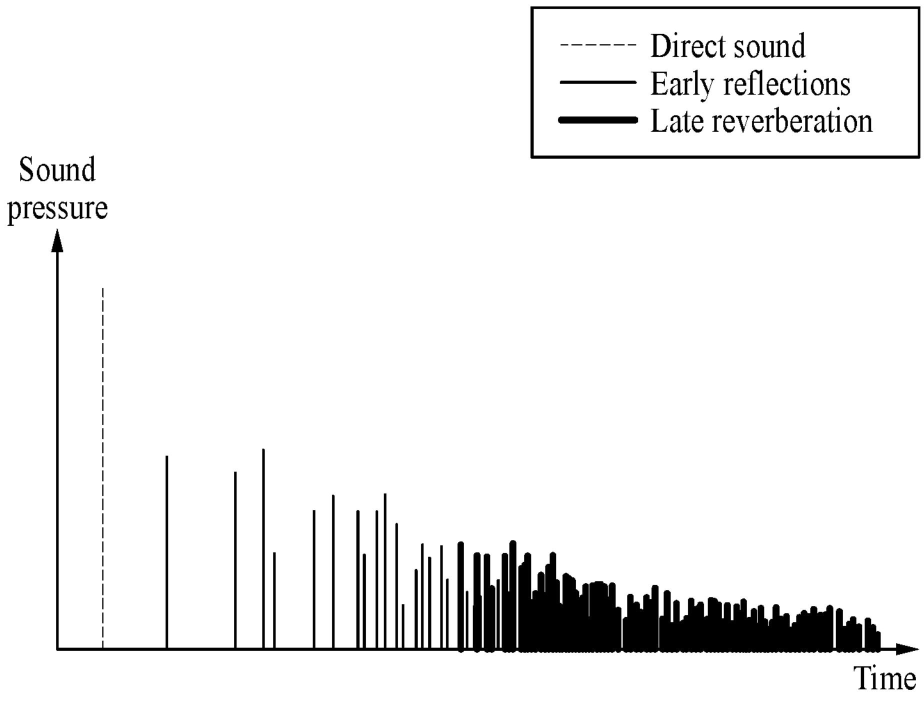
FIG. 4 is a diagram illustrating an impulse response of each of direct sound, early reflection, and late reverberation, according to an embodiment.

FIG. 4 is a diagram illustrating an impulse response of each of direct sound, early reflection, and late reverberation, according to an embodiment.

Acoustic spatial information may be information that may better simulate an acoustic characteristic of the space. However, since simulating a sound transfer characteristic using the acoustic spatial information requires a complex operation, in order to perform generation of a spatial sound transfer characteristic in a simple manner, the spatial sound transfer characteristic may be divided into direct sound, early reflection, and late reverberation, and provided acoustic spatial information may be used to generate reflection and late reverberation.

TABLE 1

| Field name | Data type | Description | Default value |
|---|---|---|---|
| idx | const int | Unique identifier of the RI | — |
| status | ItemStatus | The status of the RI (see ItemStatus type description) | — |
| type | ItemType | The type of the RI (see ItemType type description) | — |
| changed | ItemProperty | Flags to mark changed properties of the RI (see ItemProperty type description) | — |
| aparams | AParam | Flags to mark special rendering instructions for the RI (see AParam type description) | — |
| reverbId | int | Identifier of the reverberation environment this RI is located in (special value −1 if the RI is outside of all reverberation environments in the scene) | −1 |
| trajectory | Trajectory | Optional constant-velocity trajectory to interpolate the location of the RI between successive calls to the update( ) routine | None |
| teleport | bool | Whether or not this RI should be handled as teleported | false |
| position | Position | The position (location and orientation) of the RI in global coordinates (see Position type description) | — |
| apparentDistanceDelta | float | Compensation for the distance to the listener for synchronizing multiple RIs with different locations in terms of their propagation delay and distance attenuation | 0 |
| refDistance | float | Reference distance for the distance attenuation model | 1 |
| signal | StreamBuffer | Reference to a StreamBuffer instance (see Stream Manager section) | — |
| eq | List<float> | Frequency-dependent gain for the signal associated with this RI in globally defined bands (see Equalizer section) | N × 1 |
| gain | float | Global frequency-independent gain for the signal associated with this RI | 1 |
| directivity | Directivity | Optional reference to a Directivity representation for the RI (see Directivity type description) | None |
| directiveness | float | Parameter to control the frequency-independent intensity of the Directivity | 1 |
| extent | Geometry | Optional reference to a Geometry that describes the extent of the RI | None |
| extentLayout | ExtentLayout | Reference to the channel layout of a heterogeneous extended source | None |
| rayHits | List<RayHit> | Data structure to aid the processing of extended sources (see respective stages) | Empty |
| reflectionInfo | ReflectionInfo | Optional reference to a special struct that contains information about the reflection path this RI represents (see 6.6.4) | None |
| occlusionInfo | OcclusionInfo | Optional reference to a special struct that contains information about the occlusion of this RI (see 6.6.6) | None |
| channelPositions | List<Position> | | None |
| hoaInfo | HoaInfo | Optional reference to a special struct that contains information about the HOA source this RI represents (see 6.6.15) | None |

For example, the RI may include ItemStatus. ItemStatus may be processed as an active state in a renderer stage. When ItemStatus is different from the state of a previous update call (update( )call), a changed flag may be set according to a changed ItemStatus state.

For example, as shown in FIG. 4, a renderer may generate an impulse response, which is a spatial sound transfer characteristic, according to direct sound, early reflection, and late reverberation.

The renderer may perform sound processing according to occlusion. For example, sound processing according to occlusion may include sound processing according to diffraction, dispersion, and the like.

The description of the renderer with reference to FIGS. 1 to 4 may be substantially equally applied to an audio signal processing apparatus.

Figure 5:
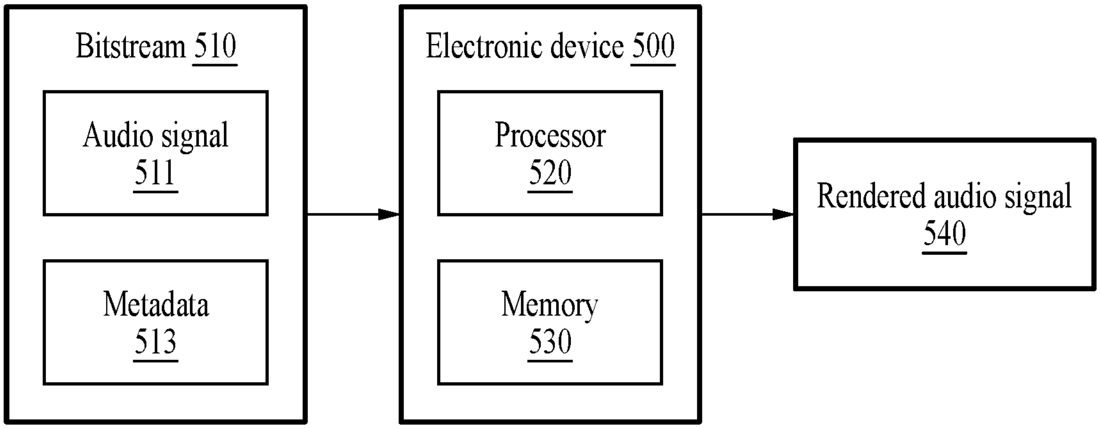
FIG. 5 is a block diagram schematically illustrating an electronic device according to various embodiments.

FIG. 5 is a block diagram schematically illustrating an electronic device 500 according to various embodiments.

Referring to FIG. 5, the electronic device 500 may include a processor 520 and a memory 530.

The processor 520 may execute, for example, software (e.g., a program) to control at least one other component (e.g., a hardware or software component) of the electronic device 500 connected to the processor 520 and may perform various data processing or operations. According to an embodiment, as at least a part of data processing or computation, the processor 520 may store a command or data received from another component (e.g., a sensor module or a communication module) in a volatile memory, process the command or the data stored in the volatile memory, and store resulting data in a non-volatile memory. According to an embodiment, the processor 520 may include a main processor (e.g., a central processing unit (CPU) or an application processor (AP)) or an auxiliary processor (e.g., a graphics processing unit (GPU), a neural processing unit (NPU), an image signal processor (ISP), a sensor hub processor, or a communication processor (CP)) that is operable independently from, or in conjunction with the main processor. For example, when the electronic device 500 includes the main processor and the auxiliary processor, the auxiliary processor may be adapted to consume less power than the main processor or to be specific to a specified function. The auxiliary processor may be implemented separately from the main processor or as a part of the main processor.

The auxiliary processor may control at least some of functions or states related to at least one (e.g., a display module, a sensor module, or a communication module) of the components of the electronic device 500, instead of the main processor while the main processor is in an inactive (e.g., sleep) state or along with the main processor while the main processor is an active state (e.g., executing an application). According to an embodiment, the auxiliary processor (e.g., an ISP or a CP) may be implemented as a portion of another component (e.g., a camera module or a communication module) that is functionally related to the auxiliary processor. According to an embodiment, the auxiliary processor (e.g., an NPU) may include a hardware structure specified for artificial intelligence (AI) model processing. An AI model may be generated by machine learning. Such learning may be performed by, for example, the electronic device 100 in which an AI model is executed, or performed via a separate server (e.g., a server). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The AI model may additionally or alternatively include a software structure other than the hardware structure.

The memory 530 may store various pieces of data used by at least one component (e.g., the processor 520 or a sensor module) of the electronic device 500. The various pieces of data may include, for example, software (e.g., a program) and input data or output data for a command related thereto. The memory 530 may include, for example, a volatile memory or a non-volatile memory.

For example, the electronic device 500 may receive a bitstream 510. For example, the bitstream 510 may include an audio signal 511 and metadata 513.

For example, the metadata 513 may include an RI such as a listener, an object, an object sound source (or an image source), and the like, and elements related to an acoustic scene such as a gain, a distance, acoustic geometry information, a user/listener position, an object position, a reference distance (or a value for setting the reference distance), and the like.

For example, the audio signal 511 may refer to object audio (or an object-based audio signal).

The electronic device 500 may determine a reference distance of an object sound source based on the bitstream 510. For example, the bitstream 510 may include the reference distance of the object sound source. For example, the bitstream 510 may include a variable (e.g., objectSourceRefDistance) set with respect to the reference distance of the object sound source. The variable set with respect to the reference distance of the object sound source may be expressed as a 10-bit unsigned integer, most significant bit first (uimsbf).

The reference distance may refer to a distance of an object sound source at which the gain of the object-based audio is 0 dB. The electronic device 500 may determine the gain of the object-based audio by applying attenuation according to the distance of the object sound source based on the reference distance.

For example, the electronic device 500 may determine the reference distance of the object sound source using a variable related to the reference distance of the object sound source included in the bitstream 510 as shown in Equation 2 below.

$$floatVal = 100 * \frac{objectSourceRefDistance}{2^{noOfBits} - 1} \quad \text{[Equation 2]}$$

In Equation 2 above, objectSourceRefDistance may indicate a variable related to the reference distance of the object sound source included in the bitstream 510, and floatVal may indicate a reference distance of an object sound source. For example, when objectSourceRefDistance is expressed as a 10-bit uimsbf, noOfBits may be 10. The reference distance calculated according to Equation 2 may be expressed in a float format.

The electronic device 500 may determine a minimum distance for applying distance-dependent attenuation based on the reference distance. For example, the minimum distance may refer to a critical distance for applying a 1/r rule.

For example, when the reference distance is greater than a set value (e.g., 0.2 m, etc.) of the minimum distance, the electronic device 500 may determine the set value to be the minimum distance. The set value of the minimum distance may indicate an initial value of the minimum distance.

For example, when the reference distance is equal to or less than the set value of the minimum distance, the electronic device 500 may determine the reference distance to be the minimum distance. For example, an operation of the electronic device 500 to set the reference distance as the minimum distance may be performed by the code in Table 2 below.

TABLE 2

```
If (refDist < dampingStart) {
    dampingStart = refDist ;
}
```

In Table 2 above, refDist may indicate the reference distance and dampingStart may indicate the minimum distance.

When the reference distance is 0.1 m and the set value of the minimum distance is 0.2 m, the electronic device 500 may determine the minimum distance as 0.1 m. The electronic device 500 may calculate the gain of the object-based audio by applying distance-dependent attenuation as shown in Equation 3 below.

$$\begin{aligned}\text{Gain [dB]} &= 20\ \log(\text{reference\_distance}/\text{current\_distance}) \\ &= 20\ \log(0.1/\text{current\_distance})\end{aligned} \qquad \text{[Equation 3]}$$

Unlike the embodiment of the present disclosure, when the reference distance is 0.1 m and the set value of the minimum distance is 0.2 m, when the reference distance is set to be the minimum distance, the gain of the object-based audio according to the distance may be calculated as shown in Equation 4 below.

$$\text{Gain [dB]} = 20\log(\text{reference\_distance}/\text{current\_distance}) = 20\log(0.2/\text{current\_distance}) \qquad \text{[Equation 4]}$$

Comparing Equation 3 and Equation 4 above, the electronic device 500 according to an embodiment may maintain the same reference distance of the object sound source even when the reference distance is equal to or less than the minimum distance. On the other hand, when the reference distance is changed to the set value of the minimum distance, the gain may be calculated according to the distance based on the reference distance that is changed to the set value of the minimum distance as shown in Equation 4 above.

The electronic device 500 may determine the gain of the object-based audio based on the reference distance and the minimum distance. When the distance of the object sound source is equal to or greater than the minimum distance, the electronic device 500 may determine the gain of the object-based audio using Equation 1 above. When the distance of the object sound source is equal to or greater than the minimum distance, the electronic device 500 may apply a distance-dependent attenuation effect to the object-based audio. The electronic device 500 may determine the gain of the object-based audio based on a ratio of the distance of the object sound source to the reference distance using Equation 1.

When the distance of the object sound source is less than the minimum distance, the electronic device 500 may determine the gain of the object-based audio to be a set size. For example, the electronic device 500 may determine the gain of the object-based audio at the minimum distance to be the gain of an object-based audio with an object sound source of which the distance is equal to or less than the minimum distance. The set size may indicate a gain of the object-based audio when the object sound source is located at the minimum distance.

The reference distance may refer to a distance at which the gain of the object-based audio is 0 dB. The electronic device 500 may determine the gain of the object-based audio according to the distance of the object sound source based on the reference distance.

In order to prevent an excessive distance gain when the listener is very close to the object sound source, a distance attenuation curve of a distance-dependent attenuation model may be applied from a predetermined critical distance. For example, the minimum distance may refer to a critical distance for applying the distance-dependent attenuation model. When the distance of the object sound source is equal to or greater than the minimum distance, the electronic device 500 may determine the gain of the object-based audio by applying the distance-dependent attenuation model. When the distance of the object sound source is equal to or greater than the minimum distance, the electronic device 500 may determine the gain of the object-based audio according to Equation 1.

Since an object sound source located very far from the listener cannot be heard, in order to avoid unnecessary rendering of the object sound source, the gain of the object-based audio according to distance may linearly decrease from a predetermined roll-off start distance (e.g., 500 m) to a roll-off end distance (e.g., 510 m). When the distance of the object sound source is equal to or greater than the roll-off end distance, the electronic device 500 may deactivate the object sound source and not render the object sound source.

When the reference distance is less than the set value of the minimum distance, gains according to a current distance (current_distance) may be compared in the cases of 1) when the reference distance is determined to be the minimum distance according to an embodiment and 2) when the reference distance is changed to the minimum distance. For example, when the reference distance is 0.1 m and the set value (or initial value) of the minimum distance is 0.2 m, the gains calculated using Equations 3 and 4 may be compared.

For example, when the current distance is 0.05 m, the electronic device 500 may determine the gain of the object-based audio to be 20 log (0.1/0.1)=0 dB according to Equation 3. Since the current distance (the distance of the object sound source) is less than the minimum distance of 0.1 m, the electronic device 500 may determine a gain when the object sound source is located at the minimum distance to be the gain of the object-based audio.

Since the current distance is less than the minimum distance of 0.2 m, the gain calculated according to Equation 4 is 20 log (0.2/0.2)=0 dB, and the same gain may be obtained.

When the current distance is 0.15 m, the electronic device 500 may determine the gain of the object-based audio to be 20 log (0.1/0.15) dB according to Equation 3. On the other hand, the gain of the object-based audio may be calculated as 20 log (0.2/0.2)=0 dB according to Equation 4.

When the current distance is 1.0 m, the electronic device 500 may determine the gain of the object-based audio to be 20 log (0.1/1.0) dB according to Equation 3. On the other hand, the gain of the object-based audio may be calculated as 20 log (0.2/1.0) dB according to Equation 4.

That is, referring to the above example, when the reference distance is equal to or less than the set value of the minimum distance, the electronic device 500 may determine the minimum distance to be the reference distance and maintain the same reference distance, thereby processing distance-dependent attenuation of the gain of the object-based audio more easily.

The electronic device 500 according to an embodiment may determine the reference distance to be equal to or greater than the minimum distance based on the bitstream 510. For example, the electronic device 500 may determine the reference distance to be equal to or greater than the set value of the minimum distance.

For example, the electronic device 500 may determine the reference distance to be equal to or greater than the set value of the minimum distance as shown in Equation 5 below.

$$floatVal = (100 - \text{min\_distance}) * \frac{objectSourceRefDistance}{2^{noOfBits} - 1} + \text{min\_distance} \quad \text{[Equation 5]}$$

In Equation 5, floatVal denotes the reference distance, min distance denotes the set value of the minimum distance, objectSourceRefDistance denotes a variable related to the reference distance of the object sound source included in the bitstream 510, and noOfBits denotes the number of bits of objectSourceRefDistance. For example, when objectSourceRefDistance is expressed as a 10-bit uimsbf, noOfBits may be 10. The reference distance calculated according to Equation 5 above may be expressed in a float format.

The electronic device 500 may determine the reference distance within a range from a value equal to or greater than the minimum distance (or the set value of the minimum distance) to a value equal to or less than a set maximum reference distance. For example, Equation 5 above may represent an equation for determining a reference distance when the set maximum reference distance is 100 m. The electronic device 500 may, according to Equation 5, determine the reference distance within a range from a value equal to or greater than min distance, which is the set value of the minimum distance, to a value equal to or less than the maximum reference distance of 100 m according to the value of objectSourceRefDistance.

The electronic device 500 may output a rendered audio signal 540 using the gain of the object-based audio.

Figure 6:
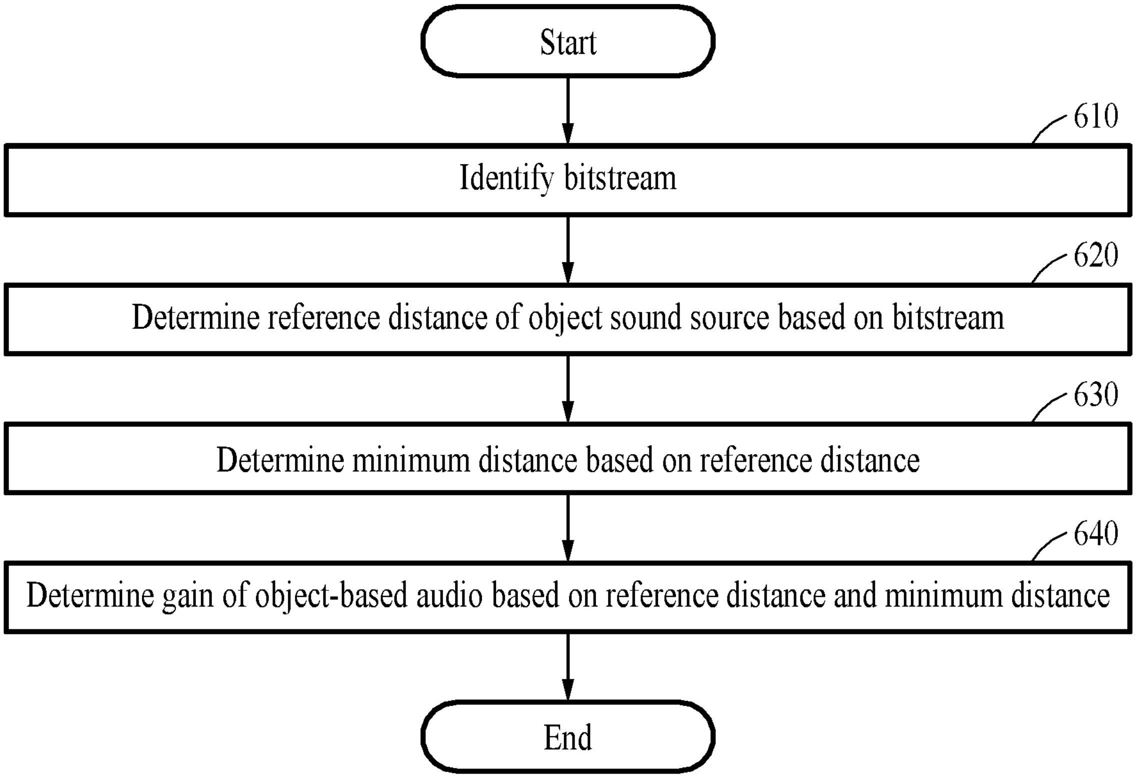
FIG. 6 is a flowchart illustrating an operation of a method of rendering object-based audio according to various embodiments.

FIG. 6 is a flowchart illustrating an operation of a method of rendering object-based audio according to various embodiments.

Referring to FIG. 6, in operation 610, the electronic device 500 according to various embodiments may identify the bitstream 510. The bitstream 510 may include the audio signal 511 and the metadata 513. For example, the metadata 513 may include a distance (or position) of an object sound source, a reference distance of an object sound source, a user/listener position, and the like. The reference distance of the object sound source may be a 10-bit uimibf variable.

In operation 620, the electronic device 500 may determine the reference distance of the object sound source based on the bitstream 510. For example, the electronic device 500 may determine the reference distance of the object sound source using a variable related to the reference distance of the object sound source included in the bitstream 510. For example, the electronic device 500 may determine the reference distance of the object sound source using Equation 2 above.

In operation 630, the electronic device 500 may determine a minimum distance based on the reference distance. The minimum distance may refer to a threshold value for applying distance-dependent attenuation according to Equation 1.

In operation 640, the electronic device 500 may determine a gain of the object-based audio based on the reference distance and the minimum distance.

For example, when the distance of the object sound source is equal to or greater than the minimum distance, the electronic device 500 may determine the gain of the object-based audio according to Equation 1.

For example, when the distance of the object sound source is less than the minimum distance, the electronic device 500 may determine a set size to be the gain of the object-based audio. For example, the set size may indicate a gain of the object-based audio when the object sound source is located at the minimum distance.

Figure 7:
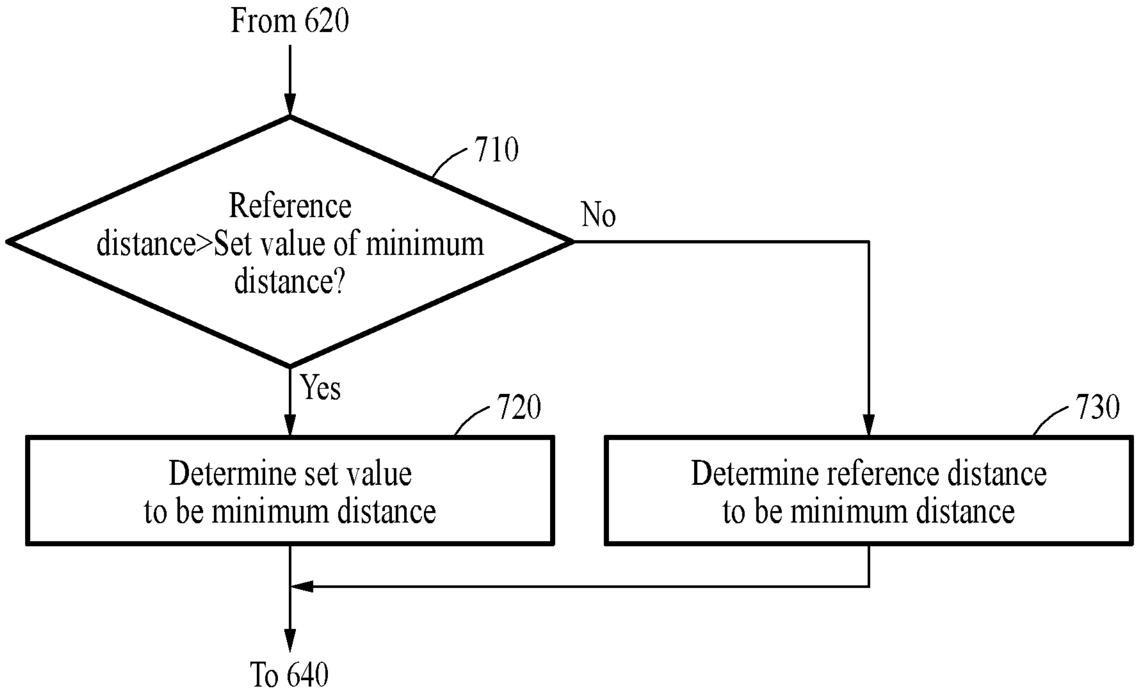
FIG. 7 is a diagram illustrating an operation of determining a minimum distance according to various embodiments.

FIG. 7 is a diagram illustrating an operation of determining a minimum distance according to various embodiments.

In operation 710, the electronic device 500 may compare a reference distance to a set value of the minimum distance. The set value of the minimum distance may indicate an initial value of the minimum distance.

When the reference distance is greater than the set value of the minimum distance according to the result of operation 710, the electronic device 500 may determine the set value to be the minimum distance in operation 720.

When the reference distance is equal to or less than the set value of the minimum distance according to the result of operation 710, the electronic device 500 may set the reference distance as the minimum distance in operation 730. For example, when the reference distance is 0.1 m and the set value of the minimum distance is 0.2 m, the electronic device 500 may determine the minimum distance as 0.1 m.

Figure 8:
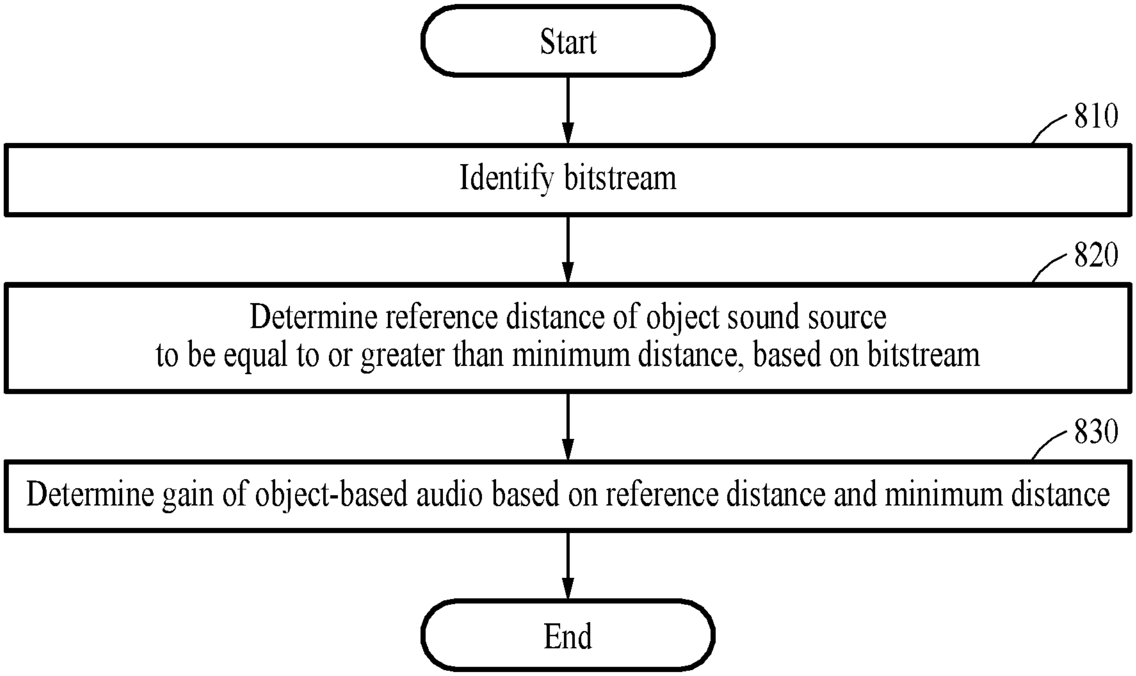
FIG. 8 is a flowchart illustrating an operation of a method of rendering object-based audio according to various embodiments.

FIG. 8 is a flowchart illustrating an operation of a method of rendering object-based audio according to various embodiments.

In operation 810, the electronic device 500 may identify the bitstream 510. The description of operation 610 of FIG. 6 may apply to operation 810 substantially in the same manner.

In operation 820, the electronic device 500 may determine the reference distance of the object sound source to be equal to or greater than a minimum distance, based on the bitstream 510. For example, the electronic device 500 may determine the reference distance of the object sound source as shown in Equation 5.

For example, the electronic device 500 may determine the reference distance within a range from a value equal to or greater than the minimum distance to a value equal to or less than a set maximum reference distance. Equation 5 may indicate an equation for determining the reference distance within a range from a value equal to or greater than the minimum distance to a value equal to or less than 100 m when the maximum reference distance is 100 m.

In operation 830, the electronic device 500 may determine a gain of the object-based audio based on the reference distance and the minimum distance. The description of operation 640 of FIG. 6 may apply to operation 830 substantially in the same manner.

Figure 9:
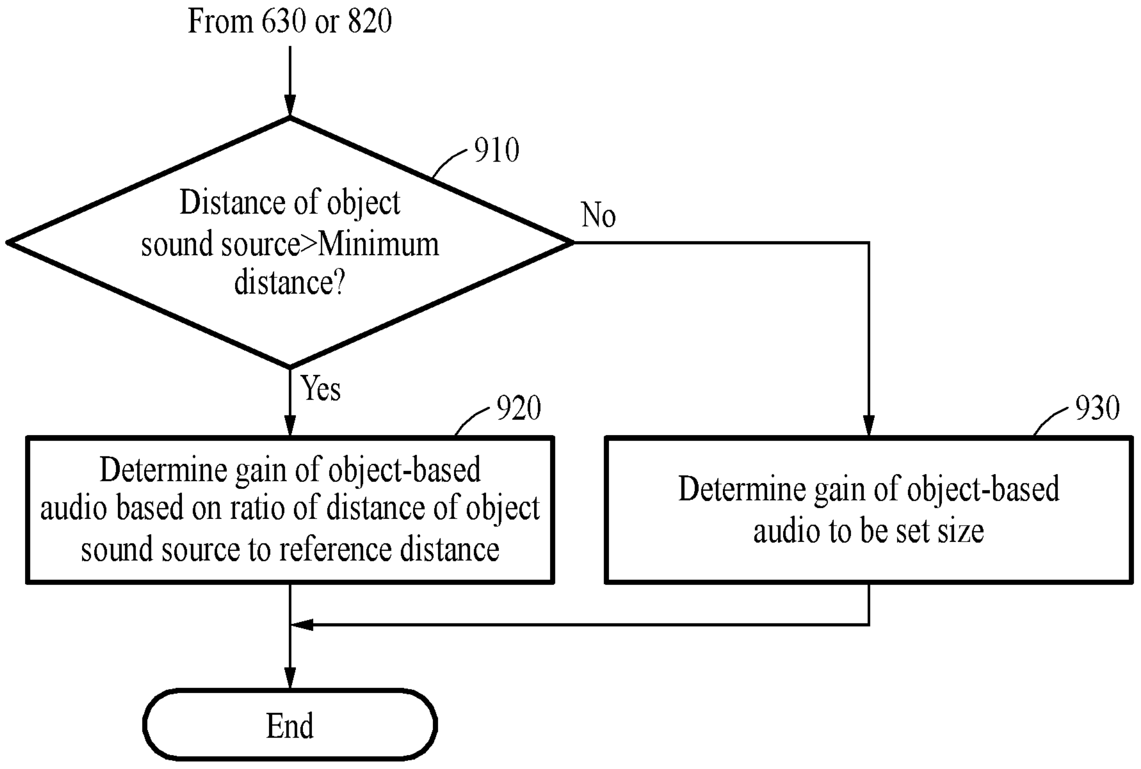
FIG. 9 is a diagram illustrating an operation of determining a gain of obj ect-based audio by an electronic device, according to various embodiments.

FIG. 9 is a diagram illustrating an operation of determining a gain of object-based audio by the electronic device 500, according to various embodiments.

In operation 910, the electronic device 500 may compare a distance of an object sound source to the minimum distance. The distance of the object sound source may refer to a distance between the object sound source and a listener. The electronic device 500 may calculate the distance of the object sound source based on the bitstream 510.

When the distance of the object sound source is greater than the minimum distance according to the result of operation 910, the electronic device 500 may determine the gain of the object-based audio based on a ratio of the distance of the object sound source to the reference distance in operation 920.

When the distance of the object sound source is equal to or less than the minimum distance according to the result of operation 910, the electronic device 500 may determine the gain of the object-based audio to be a set size in operation 930. For example, the set size may indicate the size of a gain of the object-based audio when the object sound source is located at the minimum distance.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The method according to embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, for example, a computer program tangibly embodied in a machine-readable storage device (a computer-readable medium) to process the operations of a data processing device, for example, a programmable processor 520, a computer, or a plurality of computers or to control the operations. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors 520 suitable for processing of a computer program include, by way of example, both general and special purpose microprocessors (e.g., the processor 520), and any one or more processors 520 of any kind of digital computer. Generally, the processor 520 may receive instructions and data from a read-only memory (ROM) or a random-access memory (RAM), or both. Elements of a computer may include at least one processor 520 for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, for example, magnetic media such as hard disks, floppy disks, and magnetic tape, optical media such as compact disc read-only memory (CD-ROM) or a digital versatile disc (DVD), magneto-optical media such as floptical disks, ROM, random-access memory (RAM), flash memory, erasable programmable ROM (EPROM), or electrically erasable programmable ROM (EEPROM). The processor 520 and the memory may be supplemented by, or incorporated in, special-purpose logic circuitry.

In addition, non-transitory computer-readable media may be any available media that may be accessed by a computer and may include both computer storage media and transmission media.

Although the present specification includes details of a plurality of specific embodiments, the details should not be construed as limiting any invention or a scope that can be claimed, but rather should be construed as being descriptions of features that may be peculiar to specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate sub-combination. Moreover, although features may be described above as acting in specific combinations and even initially claimed as such, one or more features from a claimed combination can in some cases be excised from the combination, and the claimed combination may be changed to a sub-combination or a modification of a sub-combination.

Likewise, although operations are depicted in a predetermined order in the drawings, it should not be construed that the operations need to be performed sequentially or in the predetermined order, which is illustrated to obtain a desirable result, or that all of the shown operations need to be performed. In specific cases, multi-tasking and parallel processing may be advantageous. In addition, it should not be construed that the separation of various device components of the aforementioned embodiments is required in all types of embodiments, and it should be understood that the described program components and devices are generally integrated as a single software product or packaged into a multiple-software product.

The embodiments disclosed in the present specification and the drawings are intended merely to present specific examples in order to aid in understanding of the present disclosure, but are not intended to limit the scope of the present disclosure. It will be apparent to one of ordinary skill in the art that, in addition to the disclosed embodiments, various other examples modified based on the technical spirit of the present disclosure may be implemented.

What is claimed is:

1. A method of rendering object-based audio, the method comprising:

identifying a bitstream;

determining a reference distance of an object sound source based on the bitstream;

determining a minimum distance for applying distance-dependent attenuation, based on the reference distance; and determining a gain of object-based audio included in the bitstream based on the reference distance and the minimum distance, wherein the determining of the minimum distance comprises determining, when the reference distance is equal to or less than a set value of the minimum distance, the reference distance to be the minimum distance.

2. The method of claim 1, wherein the determining of the minimum distance comprises:

determining, when the reference distance is greater than a set value of the minimum distance, the set value to be the minimum distance.

3. The method of claim 1, wherein the determining of the gain of the object-based audio comprises:

determining, when a distance of the object sound source is equal to or less than the minimum distance, the gain of the object-based audio to be a set size.

4. The method of claim 1, wherein the determining of the gain of the object-based audio comprises:

determining the gain of the object-based audio based on a ratio of the distance of the object sound source to the reference distance when the distance of the object sound source is greater than the minimum distance.

5. An electronic device comprising a processor, wherein the processor is configured to:

identify a bitstream;

determine a reference distance of an object sound source based on the bitstream;

determine a minimum distance for applying distance-dependent attenuation, based on the reference distance; and determine a gain of object-based audio included in the bitstream based on the reference distance and the minimum distance, wherein the processor is configured to determine, when the reference distance is equal to or less than a set value of the minimum distance, the reference distance to be the minimum distance.

6. The electronic device of claim 5, wherein the processor is configured to:

determine, when the reference distance is greater than a set value of the minimum distance, the set value to be the minimum distance.

7. The electronic device of claim 5, wherein the processor is configured to:

determine, when a distance of the object sound source is equal to or less than the minimum distance, the gain of the object-based audio to be a set size.

8. The electronic device of claim 5, wherein the processor is configured to:

determine the gain of the object-based audio based on a ratio of the distance of the object sound source to the reference distance when the distance of the object sound source is greater than the minimum distance.

* * * * *